United States Patent [19]

Lachut et al.

[11] Patent Number: 4,739,368
[45] Date of Patent: Apr. 19, 1988

[54] READER-PRINTER APPARATUS AND METHOD FOR VARIABLE LENGTH COPYING OF INFORMATION ON A STANDARD SHEET LENGTH

[75] Inventors: Eugene W. Lachut; Francis L. Soucy, both of Rochester; Bruce A. Holroyd, Fairport; Richard E. Brown, Rochester, all of N.Y.

[73] Assignee: Eastman Kodak Company, Rochester, N.Y.

[21] Appl. No.: 853,590

[22] Filed: Apr. 18, 1986

Related U.S. Application Data

[63] Continuation-in-part of Ser. No. 727,996, Apr. 29, 1985, abandoned.

[51] Int. Cl.$^4$ ............................................. G03G 15/00
[52] U.S. Cl. ..................................... 355/14 R; 355/5; 355/7
[58] Field of Search ................... 355/5, 6, 11, 66, 3 R, 355/14 R, 67–69

[56] References Cited

U.S. PATENT DOCUMENTS

| | | | |
|---|---|---|---|
| 3,289,532 | 12/1966 | Baumgarten et al. | 355/3 R |
| 3,385,161 | 5/1968 | Sage et al. | 88/24 |
| 3,479,151 | 11/1969 | Miller et al. | 355/68 |
| 3,639,058 | 2/1972 | Kimura | 355/83 |
| 3,765,759 | 10/1973 | Yamada | 355/45 |
| 3,907,418 | 9/1975 | Okuyama | 355/5 X |
| 4,215,929 | 8/1980 | Sato et al. | 355/7 |
| 4,249,820 | 2/1981 | Freeman et al. | 355/29 |
| 4,341,463 | 7/1982 | Kashiwagi | 355/5 X |
| 4,367,033 | 1/1983 | Watanabe | 355/66 X |
| 4,417,805 | 11/1983 | Kishi | 355/7 X |
| 4,582,417 | 4/1986 | Yagasaki et al. | 355/7 |
| 4,591,264 | 5/1986 | Ueda et al. | 355/68 |
| 4,616,269 | 10/1986 | Mori | 355/7 X |
| 4,641,951 | 2/1987 | Takagi et al. | 355/7 |

FOREIGN PATENT DOCUMENTS 3309578 9/1984 Fed. Rep. of Germany.
59-216133 12/1984 Japan.

OTHER PUBLICATIONS

Operating Instructions, 900 Page Search Reader—Printer, published Nov. 1982 by 3M.

*Primary Examiner*—R. L. Moses

[57] ABSTRACT

A microform reader-printer apparatus includes a viewing screen having ruler-like fiducial marks that are indicative of distance from an edge of an image frame being viewed. The apparatus includes a keyboard permitting the operator to input data to a printer control regarding the portion of the image frame which is desired to be copied by the printer. In the printing mode the portion of the image frame selected for reproduction is printed using an electrophotographic reproduction engine. An electro-static image of the image selected for reproduction is formed on a photoconductive drum by translating a pair of scanning mirrors. Means including a notched bracket movable with the scanning mirror is provided for controlling the "on" time of a projection lamp and/or corona charger so that electrostatic image formation occurs only for the portion of the image frame selected for reproduction. Adjustments to lamp "on" time are also made for different lamp brightness readings, since brighter lamps take a longer time to quench. Means are also provided for controlling lamp brightness in accordance with the exposure requirements of the portion selected for reproduction. The electrostatic image is then developed and transferred to a standard size copy sheet. The copy sheet thus includes only the image area selected for reproduction and clear areas upon which notes or comments may be written.

24 Claims, 12 Drawing Sheets

READER-PRINTER APPARATUS AND METHOD FOR VARIABLE LENGTH COPYING OF INFORMATION ON A STANDARD SHEET LENGTH

CROSS-REFERENCE TO RELATED APPLICATION

This application is a continuation-in-part application of U.S. application Ser. No. 727,996, filed on Apr. 29, 1985 in the names of Eugene W. Lachut and Francis L. Soucy, now abandoned. This application is also related to U.S. application Ser. No. 727,992, filed on Apr. 29, 1985 in the names of Gary R. Matson et al and entitled Reader-Printer Apparatus With An Improved Viewing and Print Mirror Assembly.

BACKGROUND OF THE INVENTION

1. Field of the Invention

This invention relates to an apparatus in which are incorporated, in combination, a reader for viewing microforms and a copying system for making enlargements thereof. The invention further relates to a method for making enlargements of images stored on microform.

2. Description of the Prior Art

The practice of using reader-printer apparatus comprising the combination of a copying system and a reader is quite popular. There is increasing demand for reader-printer apparatus of the type which permits a microform either in the form of a positive or a negative to be selectively handled. One known reader-printer apparatus of this type is the RP505 manufactured by Minolta Camera Co., Ltd. of Osaka, Japan. This reader-printer apparatus includes an optical system for imaging a microform onto a screen during a viewing mode and an electrophotographic reproduction engine for reproducing enlargements of the microform onto copy sheets such as plain paper. A disadvantageous feature of this apparatus is that there is no capability to readily reproduce only portions of an image frame stored on a microform. One could of course reproduce an entire image frame and cut out the portion not desired but that is not a suitable solution since additional toner used to develop the undesired copy portion is wasted. Furthermore, it is often desirable to have clean space on the copy provided for writing notes about the image that is reproduced thereon.

The need for reader-printers to have the capabilities of reproducing only portions of an image frame is of primary importance in today's business world where matters of privacy and security are of increasing concern.

In U.S. Pat. No. 3,385,161 there is disclosed a reader-printer apparatus having the capability of reproducing a selected portion of an image frame stored on a microform. An editing bar is associated with the viewing screen. The operator, by movement of the bar along the screen, produces, through a mechanical linkage, movement of a mask over the copy paper. A corona charger is moved over only unmasked portions of the copy paper and, after light exposure of the copy paper to the image frame, development takes place only on the portions of the copy sheet located beneath the mask.

While this apparatus may work well it does require exposure directly to the copy sheet and thus a special type of paper must be used. Such apparatus also tends to be larger and not as desirable as more compact apparatus which use a scanning type of exposure and permit copies to be produced on media such as plain paper or transparent sheets.

It is therefore one object of the invention to provide a reader-printer apparatus and method having the capability of producing copies of images stored on microform wherein portions of image frames may be selectively edited when making enlargements and wherein the reproductions may be produced on media such as plain paper, etc.

It is a further object of the invention to provide a reader-printer apparatus and method having the capability of producing copies of images stored on microform wherein portions of image frames may be selectively reproduced in accordance with the exposure requirements for said portions.

SUMMARY OF THE INVENTION

The above and other objects are achieved in a microform reader-printer apparatus having the reader portion provided with means for delineating a portion of an image frame for reproduction, and the improvement of signal producing means for inputting electrical signals identifying the portion of the microform image frame selected to be reproduced; and control means for controlling the image processing means to produce on the copy sheet only the image portion of the microform image frame selected for reproduction.

An improved method is also provided for reproducing selected portions of information stored on a microform, the improved method includes the steps of selecting of a portion of an image on an image frame to be reproduced and producing signals representing the portion selected or the portion not selected, exposing the image portion selected upon a photosensitive member and inhibiting formation of an image of the portion of the image frame not selected for reproduction.

An improved microform reader-printer apparatus is also provided having the reader portion provided with means for identifying a portion of an image frame for reproduction, and the improvement of signal producing means for inputting electrical signals identifying the portion of the microform image frame selected to be reproduced; and exposure intensity control means for controlling the intensity of light projected onto a photosensitive member in accordance with the exposure control requirements for the selected portion.

DETAILED DESCRIPTION OF THE PREFERRED EMBODIMENTS

Because reader-printer apparatus are well known, the present description will be directed in particular to elements forming part of or cooperating more directly with the present invention. Elements of reader-printer apparatus not specifically shown or described herein are selectable from those known in the prior art.

Figure 1:
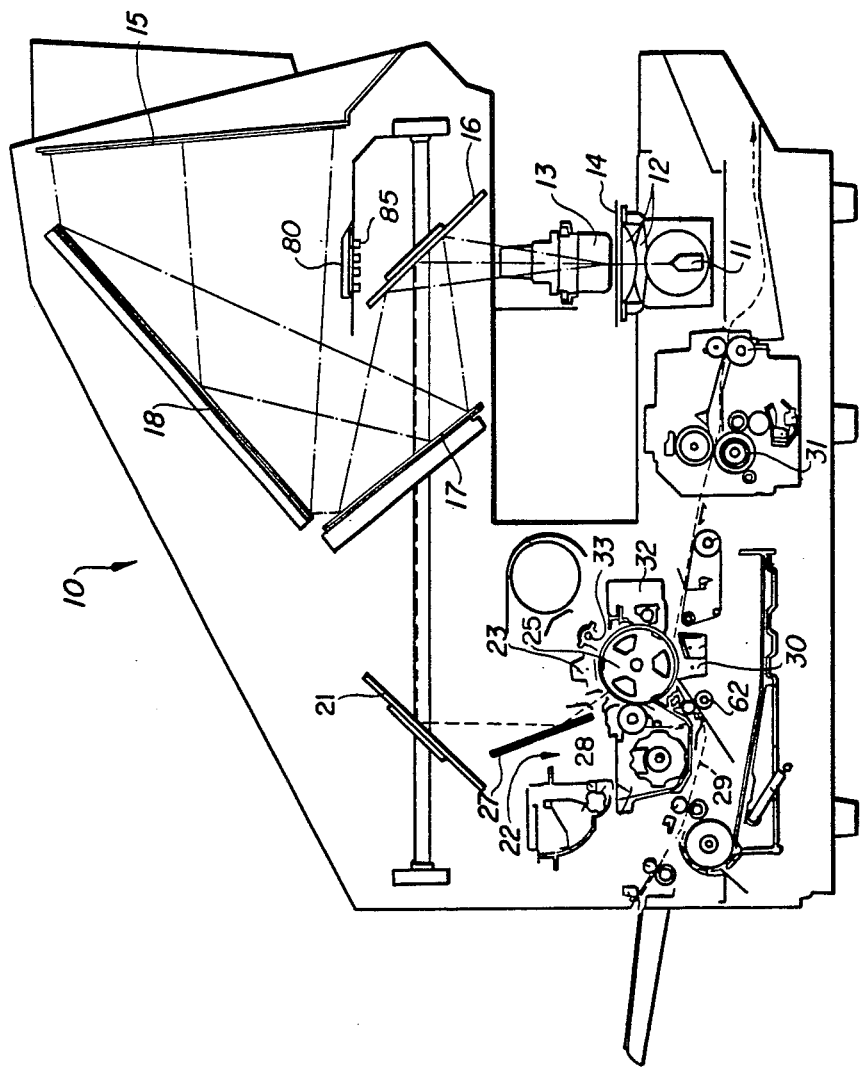
FIG. 1 is a diagrammatic side elevational view showing the functional components of a prior art reader-printer apparatus.

With reference now to FIG. 1, a prior art reader-printer apparatus known as the aforementioned RP-505 is shown. The apparatus includes a projection lamp 11, condenser lens assembly 12 and a projection lens 13 for projecting an enlarged image of a microform such as microfilm 14 onto a projection screen 15 via mirrors 16, 17 and 18.

Figure 2:
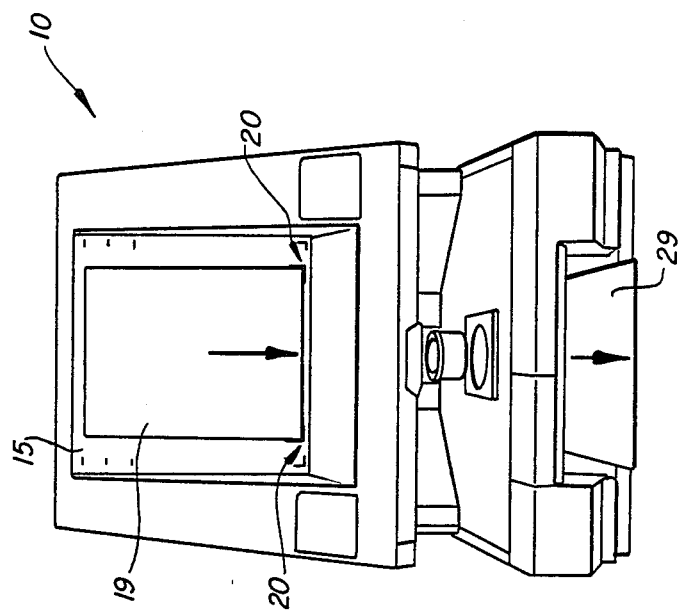
FIG. 2 is a diagrammatic front elevational view of the prior art reader-printer apparatus of FIG. 1.

With reference now also to FIG. 2, during the viewing or reading mode the image 19 of say a document page stored on the microform is located on the screen by suitable conventional means so that an edge of an image of the document page is in alignment with image positioning marks 20. While description will now be made with reference to the microform images appearing as document pages, it should be appreciated that the images may not be of pages but could be of checks or other type of documents. The term "image frame" will be used to broadly describe an image appearing on the viewing screen and comprising the area of information subject to being reproduced onto a particular size copy sheet in a normal print operation wherein the apparatus reproduces a maximum amount of information upon a copy sheet for the magnification selected. To produce a print, a print button is depressed to change the mode of the reader-printer apparatus from the reading mode to a printing mode. In the printing mode, means are provided for pivoting mirror 17 from the position shown in FIG. 1 so that it is no longer in blocking relationship to mirror 21. This latter mirror cooperates with mirror 16 to form a scanning mirror pair for imaging an enlarged image of document page 19 onto a photoconductive drum 25 that is part of an electrophotographic printing engine 22.

Figure 3:
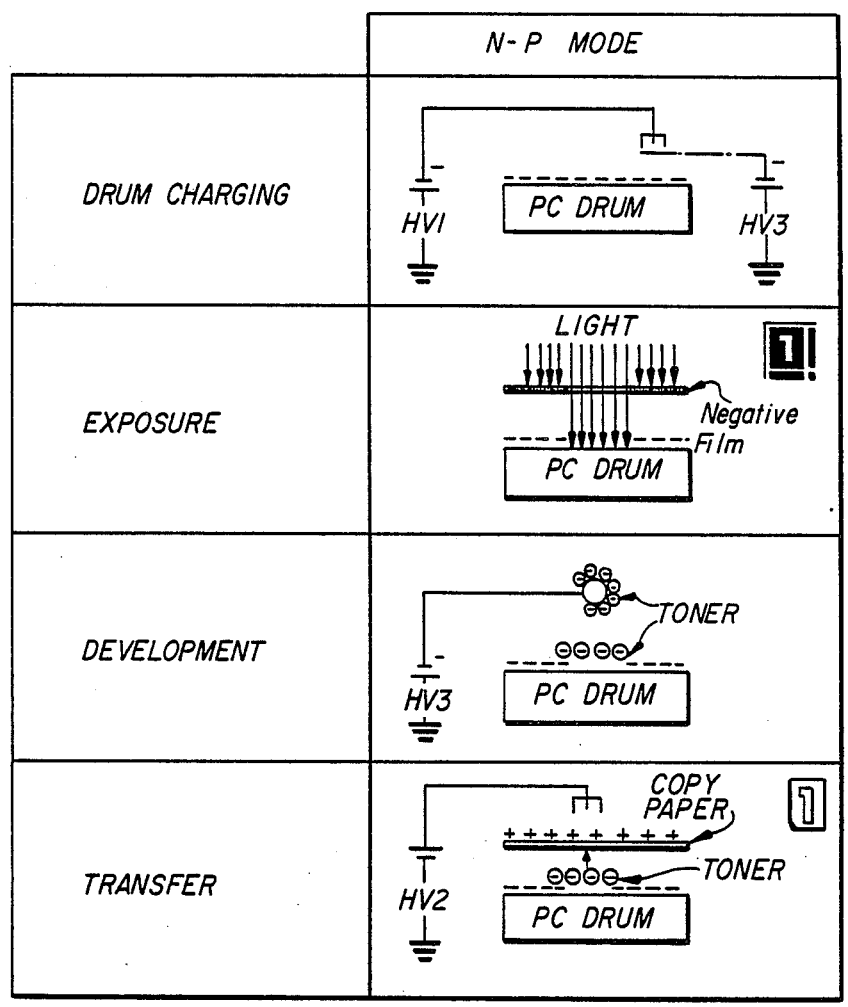
FIG. 3 is a chart illustrating the various prior art process steps used in one mode of the electrophotographic engine used in the apparatus of FIG. 1.
Figure 4:
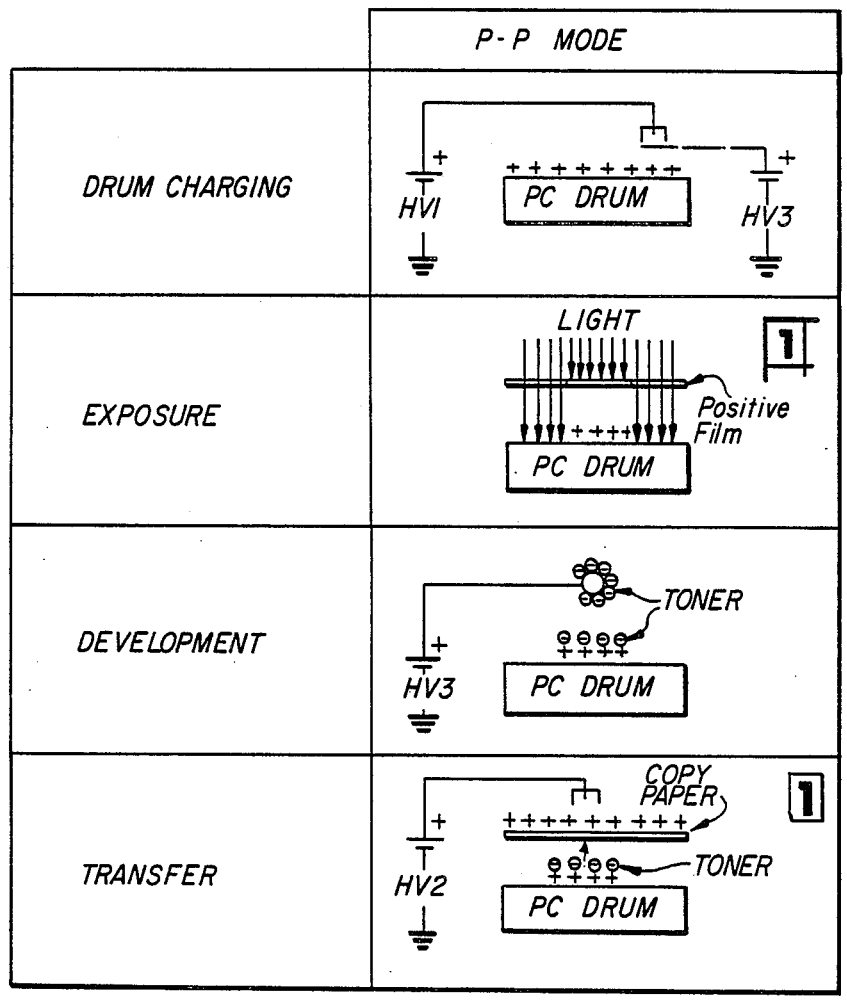
FIG. 4 is a chart illustrating the various prior art process steps used in a second mode of the electrophotographic engine used in the apparatus of FIG. 1.

With reference now also to FIGS. 3 and 4, the engine is adapted to be operated in two modes. In the N-P mode an image of a document that is stored on a microform as a negative image is reproduced as a positive image on a copy sheet. This is accomplished by having a corona charger 23 be electrically coupled to a highly negative electrical power supply to form a corona discharge of negative ions that flow towards the surface of drum 25 as it is rotated. A grid electrode may be electrically biased by a grid power supply to control the voltage level of charge deposited on the drum. During the exposure process the image 19 of the document page is scanned in increments upon the rotating drum via mirrors 16, 21 and 27 to form a latent electrostatic image of the document page. The latent image is developed as the drum rotates past a development station 28 wherein negatively charged electroscopic toner is selectively attracted to areas of the drum which have been exposed to imaging radiation passing through the microform image of the document page to form a visible image. The developed image on the drum is then transferred to a copy sheet 29 of say plain paper by advancing the copy sheet so that a leading edge thereof is moved into engagement with the drum in synchronism with the edge of the developed image of the document page. The copy sheets may be stored as discrete sheets of standard size in a cassette located below the drum 25. This edge of the image corresponds to the edge aligned with the image positioning marks 20 found on screen 15. As segments of the copy sheet are continuously moved into engagement with the drum, an image transfer corona charger 30 applies a positive charge to the backside of the sheet. As each sheet segment leaves contact with the drum the negatively charged toner remains attracted to the sheet and the image is thus transferred to the sheet. The sheet is then passed between a pair of fusing rollers 31 to fix the toner to the sheet. The drum is then rotated past a cleaning station 32 wherein residual toner not transferred to the sheet is removed. An erase lamp 32 is illuminated to erase charge from the drum prior to forming the next copy.

In the P-P mode an image of a document page that is stored on a microform as a positive image is reproduced as a positive image on a copy sheet. In this mode corona charger 23 is coupled to a positive electrical power supply and deposits a positive charge on the drum whose potential level is controlled by a grid electrode coupled to a suitable power supply. As the drum rotates it is exposed to the image of the document page and an electrostatic latent image is formed on the surface. The latent image is developed with the negatively charged electroscopic toner and transferred and fixed to a copy sheet as described above.

Figure 5:
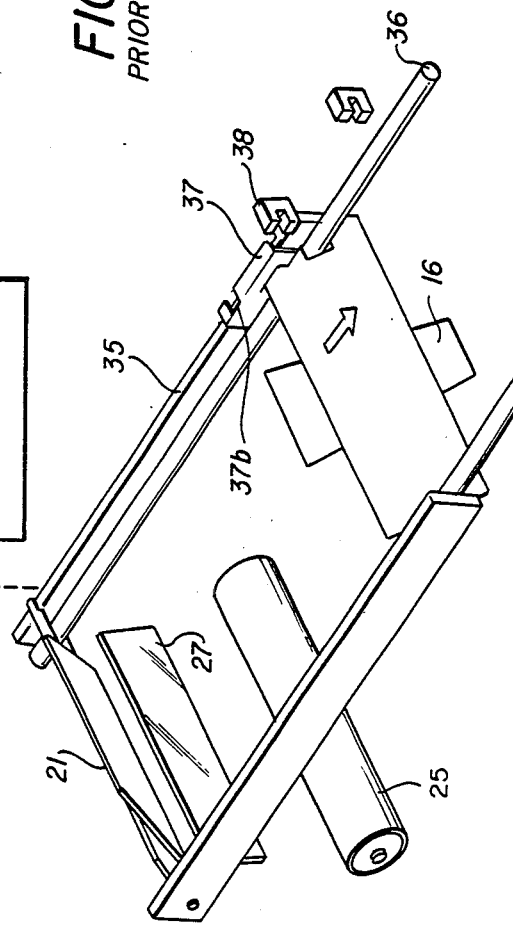
FIG. 5 is a perspective view of a scanning mirror assembly used in the prior art apparatus of FIG. 1.
Figure 6:
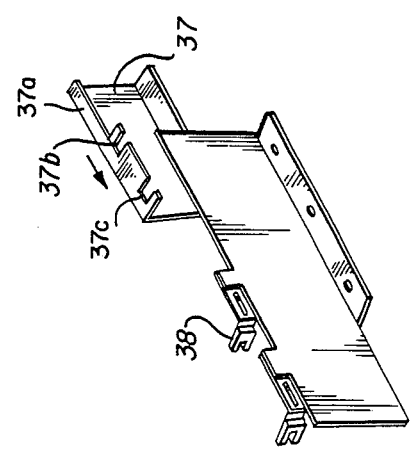
FIG. 6 is a perspective view of a mechanism for use in an improved reader-printer apparatus of the type described herein.
Figure 8:
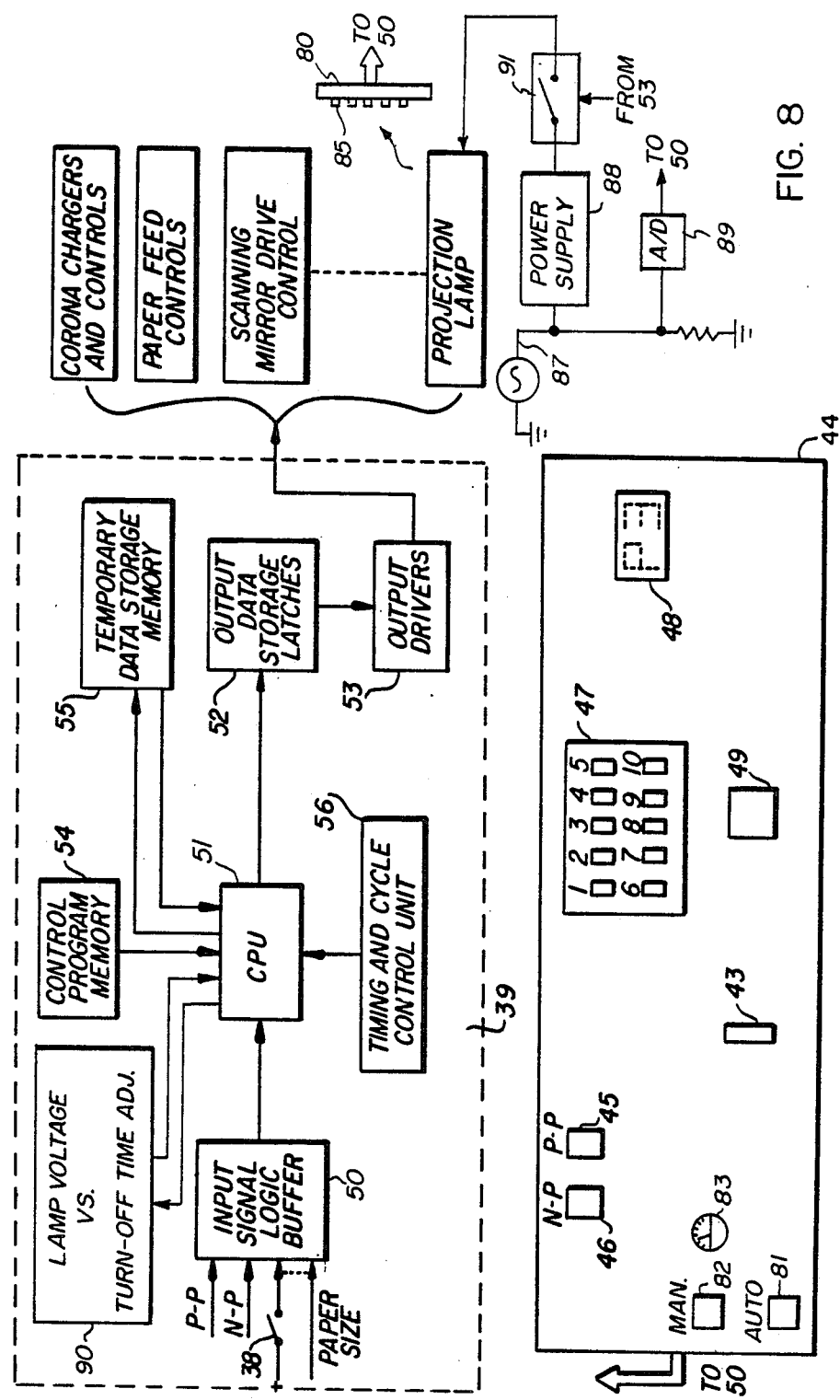
FIG. 8 is a schematic of a control panel and circuit for controlling an improved reader-printer apparatus of the type described herein.
Figure 9:
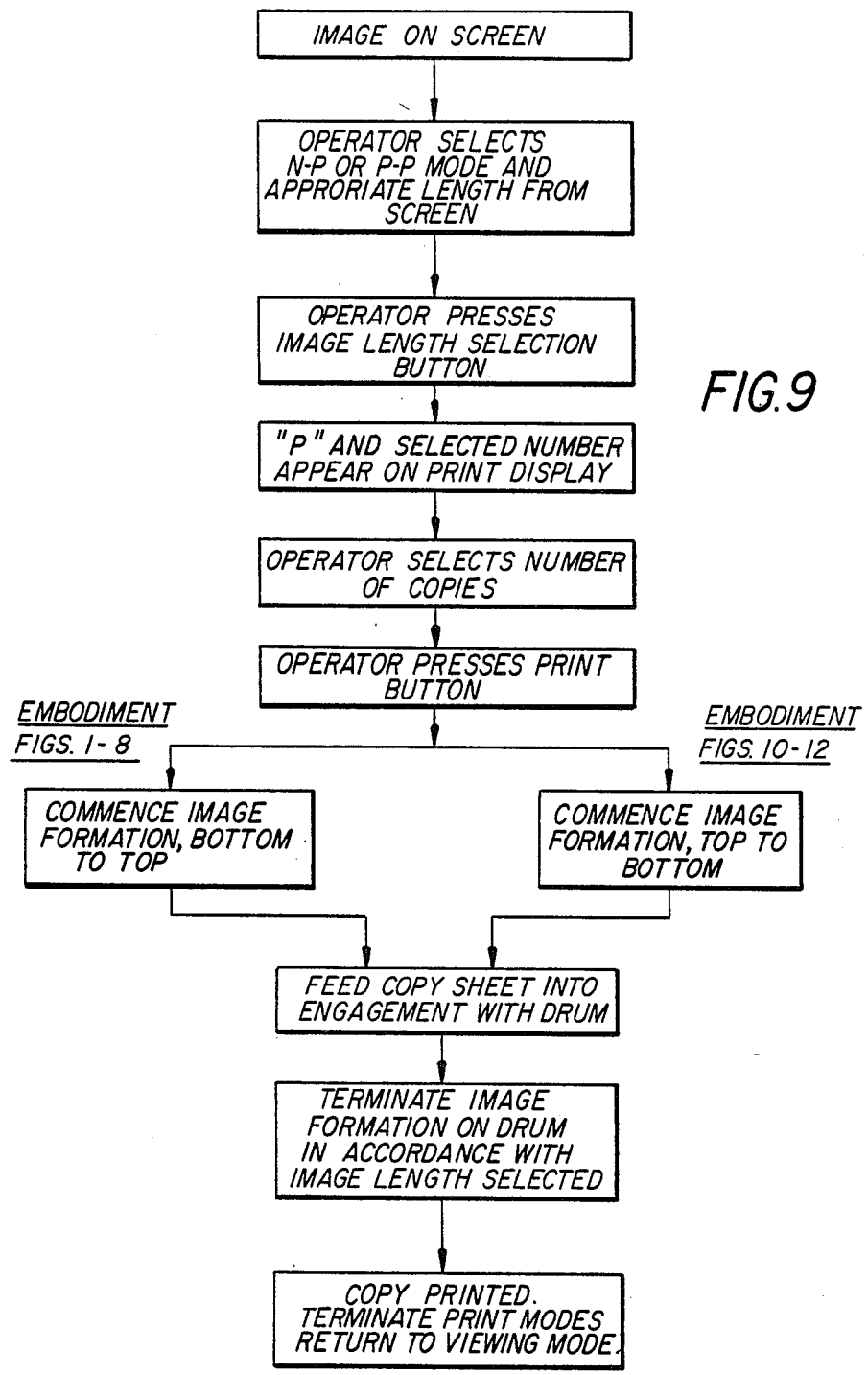
FIG. 9 is a flow chart representing the flow of information inputted by an operator using the improved reader-printer apparatus and the use to which this information is made by the reader-printer apparatus.

With reference now to FIGS. 5 and 6, the mirrors 16 and 21 are shown to be supported on a carriage 35 for translating the mirrors along rails 36. A bracket 37 secured to the carriage and movable therewith includes a flange 37a which contains a notch 37b. As the carriage translates in the direction of the arrow, the flange moves within a magnetic field of a reed switch 38. The sensing of the flange 37a by reed switch 38 provides an input signal to the reader-printer's logic and control unit 39 (described below and shown in FIG. 8) to actuate a solenoid operated clutch (not shown) associated with synchronizing rollers 62 (see FIG. 1) forming part of the copy sheet transport system to feed a copy sheet into image transfer relationship with the drum 25 in synchronism with the edge of the developed image of the document page. With further movement of the mirrors, the notch 37b eventually is detected by the reed switch and a signal is communicated to the reader-printer's logic and control unit. The logic and control unit in response to this signal sets selected timer programs. The particular timer devices selected will depend upon inputs provided by the operator and include the mode selected (N-P or P-P), paper size (detected for standard sizes automatically), multiple copy mode or single copy mode, etc. These timer programs are used to deenergize the corona charger 23 and the projection lamp 11 subsequent to completion of scanning of the image of the entire document page 19 on the drum 25.

Figure 7:
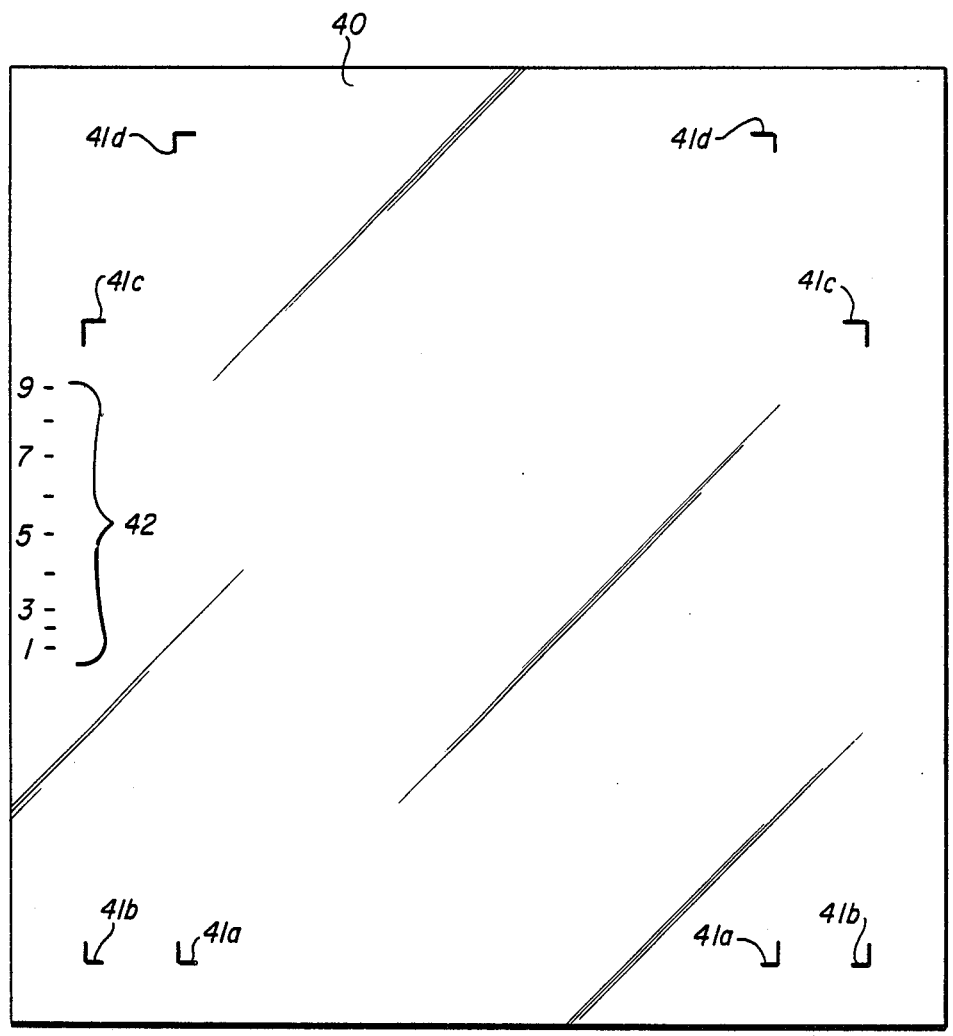
FIG. 7 is a front view of a screen for use in an improved reader-printer apparatus of the type described herein.

With reference now to FIG. 7, a screen 40 is shown that is specifically adapted for use with the present invention. The screen 40 includes conventional image positioning marks 41 *a-d* for locating images of standard size sheets. It being understood of course that the reader portion of the apparatus includes suitable transport means for locating the corners of the image of a microformed document page within the appropriate group of image positioning marks. This suitable means may be either manual or automatic as is well known in this type of apparatus for transporting microformed media. In addition to the markings 41 *a-d* there is also provided a series of nine ruler-like fiducial marks 42 each defining or delineating a predetermined vertical distance from the bottom image positioning marks 41*a,b*. When an image of a document page (or the bottom of the image portion desired to be reproduced) has its bottom edge aligned with marks 41*a* or 41*b*, the fiducial marks may be used to define those portions of the document page (or image) which are to be reproduced when a copy of the document page or image is made during the printing mode. For example, and with reference now to FIG. 8, an image length selection button 43 has been added to a control panel 44 which in the prior art apparatus included a P-P and N-P mode buttons 45, 46; number of copies buttons 47, two digit display 48 and print button 49. Inputs from pressing the aforesaid buttons are applied through input signal logic buffer 50 of the reader-printer's logic and control unit (LCU) 39. The input signals to signal buffer 50 consist of logic level digital signals which may be stored in a temporary data storage memory 55 in the microprocessor based LCU. Output data for controlling the apparatus are provided by the LCU with output data storage latches 52 and output drivers 53. The drivers in turn directly control operation of the apparatus' components such as motor(s) clutches, solenoids, power switches lamps, chargers and various displays. The LCU's processing functions can be programmed by changing instructions stored in the computer's control program memory 54. The LCU also includes a central processing unit 51 and timing and cycle control unit means 56.

With the pressing of the image length selection button 43 a program for initiating a routine to control the copying process is called up in the control program memory so that less than the full document page or image frame is reproduced. The portion of the document page to be reproduced is indicated by pressing one of the number of copies buttons 47 prior to pressing button 43. Thus if the operator wishes to reproduce only the bottom 4½ inches (11.43 cm) of the image of the document page being viewed the button labeled with the number "3" is pressed and will be stored in nonvolatile temporary memory 54 upon actuation of the image length selection button 43. The logic circuitry for storing this input may be such as to retain it in memory until changed by input of a different image length selection input. After, the operator presses button 43, the N-P or P-P buttons 46, 45 are used to select the mode. The operator also then enters the number of copies desired (using buttons 47) and presses the print button 49. When the print button 49 is pressed an imaging operation takes place according to a predetermined timed sequence. As it is desired to reproduce only the portion of the image below fiducial mark 3 (on FIG. 7) and since the bottom of the image is reproduced first, the timing sequence provides that during the first portion of the scan period the corona charging device 23 and projection lamp 11 are turned on until the portion of the image which is desired to be reproduced has been scanned. To accomplish this the control program 54 contains a routine that is called-up in response to depression of the image length selection button 43. This routine will commence operation of timer routines which control operation of the corona charger 23 and projection lamp 11 for time periods subsequent to sensing of a notch 37*c* by reed switch 38. Notch 37*c* has been added in accordance with the invention to the prior art bracket 37 which included flange 37*a*, notch 37*b* and reed switch 38. The length of the timer routines will be determined according to the operator's input using the buttons 47 to signify image length. After the time periods controlled by the timer routines the corona charging unit 23 and projection lamp 11 will be inhibited or turned off in accordance with the image length selected by the operator. During the scanning exposure period the copy sheet 29 has been moved into engagement with the drum for transfer of the image formed on the drum. Copy sheet movement is in accordance with the regular timed program in synchronism with image formation. However, only the image portion present below fiducial mark "3" is recorded on the sheet since no charging of the drum and imaging illumination by lamp 11 on the drum is provided for the image information located on the document above fiducial mark "3" is recorded on the sheet since no charging of the drum and imaging illumination by lamp 11 on the drum is provided for the image information located on the document above fiducial mark "3".

Thus there has been described a reader-printer apparatus having the capability of producing copies of documents stored on a microform wherein portions thereof may be selectively edited when making enlargements and wherein the reproductions may be produced on media such as plain paper, etc.

In the reader-printer apparatus illustrated in FIGS. 1-8 exposure of the image of the document page upon the drum was made by incremental exposure of the image of a document page from the bottom of the page to the top of the page. In the reader-printer apparatus illustrated in FIGS. 10-12 the optical system is modified to provide for exposure of an image stored upon a microform so that incremental exposure of the image is made from top to bottom. In the description of the apparatus of FIGS. 10-12 items identified with a prime (') are similar in function to items identified with the same number in the description of the embodiment of FIGS. 1-8.

Figure 10:
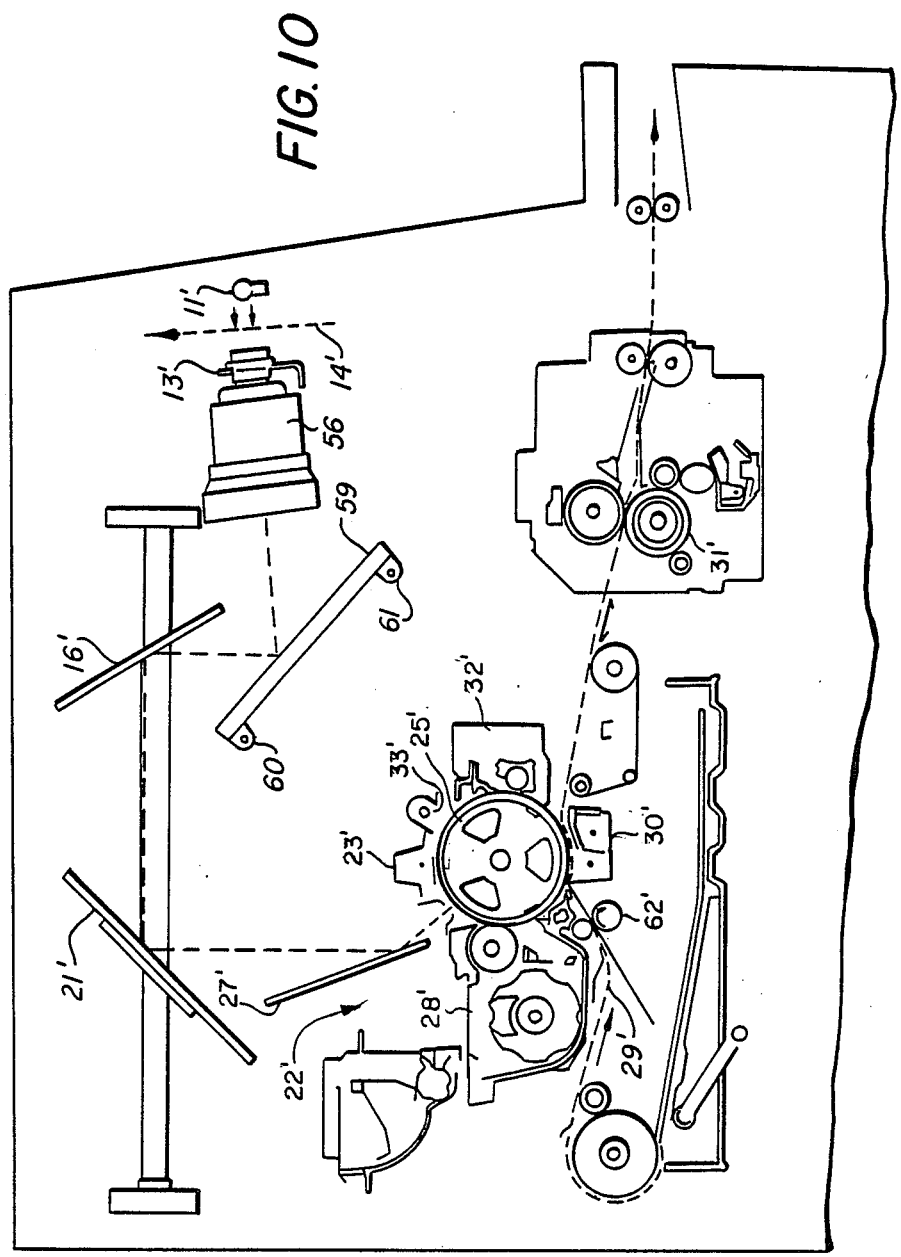
FIG. 10 is a diagrammatic side elevational view showing the functional components of an improved reader-printer apparatus.
Figure 11:
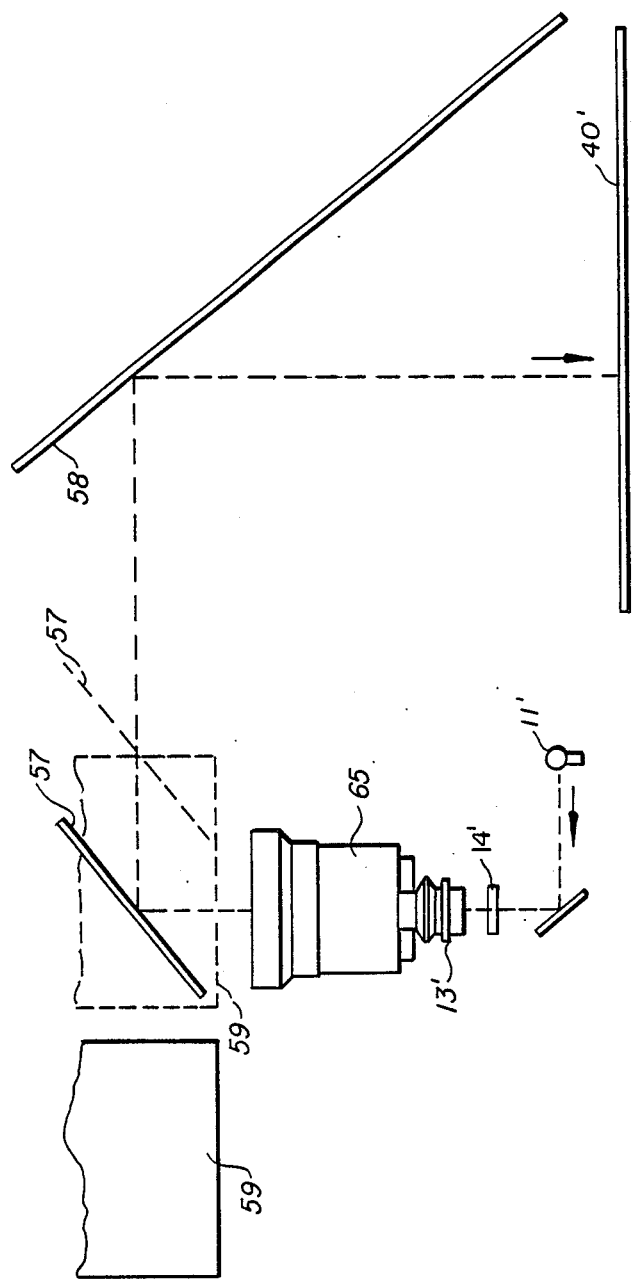
FIG. 11 is a top view sketch showing certain optical elements used in the reader mode of the improved reader-printer apparatus of FIG. 10.
Figure 12:
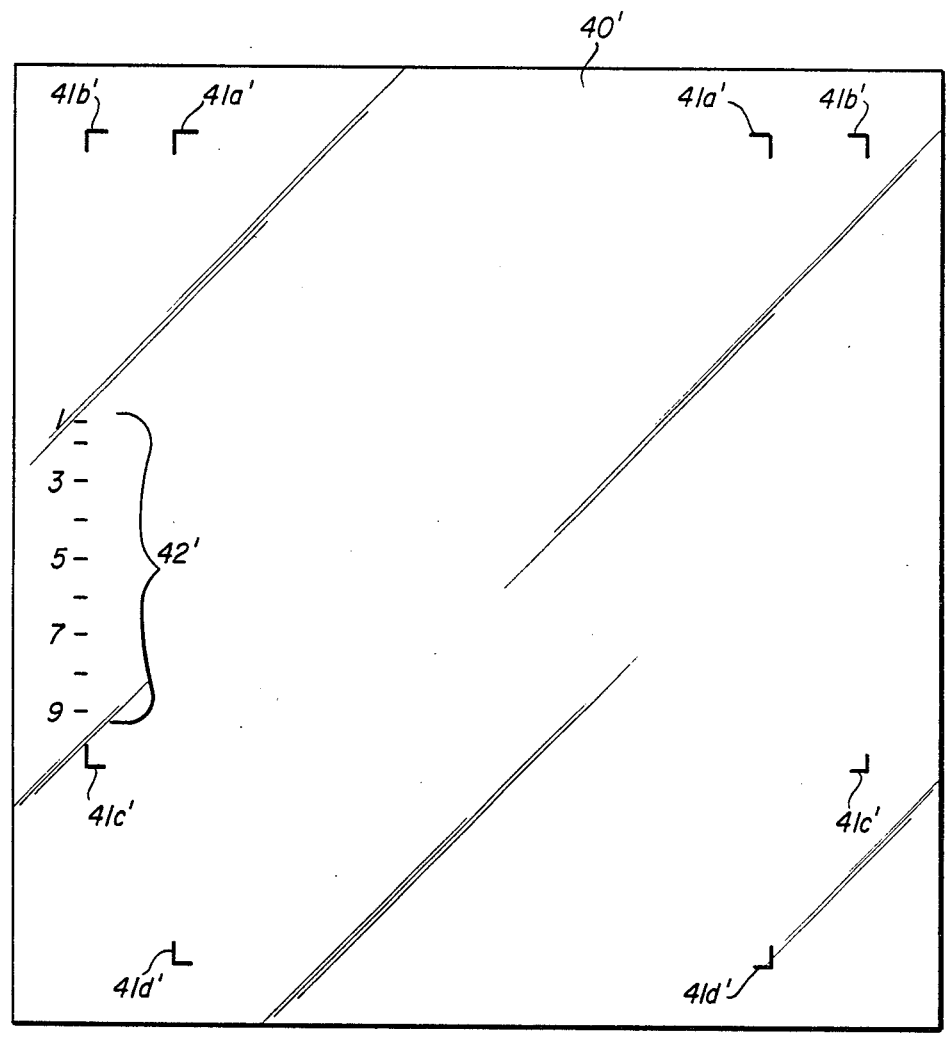
FIG. 12 is a front view of a screen for use in the improved reader-printer apparatus of FIG. 10.

In the apparatus of FIGS. 10-12 a microform such as microfilm 14' is located by conventional means in a film gate (not shown) wherein in the viewing mode as shown in FIG. 11 the image of a document page stored on the microform is illuminated by projection lamp 11'. Light passing through the microform image is then passed through a projection lens 13' and dove prism assembly 65, reflected from mirrors 57 and 58 onto a viewing screen 40 which is shown in FIG. 12. The use of a dove prism is well known in the art for allowing the operator to turn the image 90° when viewing and making copies. Before making a copy of a document page (or other image) the image of the top edge of the document page (or the top of the image portion desired to be reproduced) is registered with the image positioning marks 41 $a'-b'$ in FIG. 12. When a copy of the document page is desired an operator control panel is used that is similar to that shown in FIG. 8. The various inputs are provided by the operator to the apparatus' logic and control unit which is also similar to that shown in FIG. 8. In the print mode a mirror 59 supported on horizontally disposed guide rails 60, 61 moves into its print position in place of mirror 57. The projection lamp 11' is then turned back on and the scanning mirrors 16', 21' are moved towards the right as viewed in FIG. 10. A latent image of the document page is electrostatically formed on the photoconductive drum, developed and transferred to a standard size copy sheet of say plain paper in a manner similar to that described for the operation of the apparatus of FIG. 1.

In instances where the operator desires to copy only say the topmost 4½ inches (11.43 cm) of the document page the inputs by the operator to the control panel are the same for that described previously. The program in the logic and control unit and the timing of the operations will also be similar. Since the topmost portion of the document page is formed first on the drum 25' the corona charger 23' and projection lamp 11' will be turned on prior in time to movement of the copy sheet 29' into engagement with the drum 25'. The polarity of the corona charger 23' will, of course, be determined by the mode instructed by the operator for either N-P or P-P operation. Operation of the corona charger and projection lamp may be in response to and a short time period after movement of mirror 59 into its print position. For a more complete description of mirrors 59 and 57 reference may be had to the patent application cross-referenced above. Mirrors 16', 21' are supported on a carriage similar to that shown in FIG. 5 and description thereof will be had with regard to that figure as well as FIG. 6. As the scanning mirrors 16', 21' begin to move to the right as viewed in FIG. 10, the reed switch 38 (FIG. 6) is actuated by the flange 37a on bracket 37. Actuation of this switch is used to also activate a solenoid actuated clutch (not shown) in the paper supply synchronizing rollers 62' to advance a copy sheet into engagement with the drum in synchronism with the developed image of the top edge of the document page. As the bracket 37 (and scanning mirrors) move further in the direction of the arrow in FIG. 6 the notch 37c is sensed and after a predetermined time period terminates or inhibits image formation on the drum dependent upon the image length selected. The sensing of the notch 37c by reed switch 38 may be used to terminate directly image formation for the shortest length selected (i.e., when line number 1 on the screen is selected). Where longer lengths of image information are selected for reproduction the notch is used as a reference to begin a count based upon a time table in the logic and control unit's program memory to terminate image formation at a time corresponding to that when latent electrostatic image formation for information situated below the line selected would otherwise be formed on the drum.

While use of the notch 37c has been discussed herein as the reference for use in control of timing of the described operations in actuality the edges of the notch are to be used as the synchronizing points. The first edge of the notch encountered by switch 38 is used as a reference for terminating a P-P image by turning off the corona charger 23'. The second edge encountered is used as a reference to terminate an N-P image by turning off the projection lamp 11'. The point of projection of image upon the drum and the point of application of the corona are 1.2 inches (3.0 cm) apart. The notch 37c which moves at one half the speed of the drum is made 0.6 inches (1.5 cm) wide so that the synchronizing edges of the notch terminate respective operations at an equivalent point on the drum. In the P-P mode it is also preferred to turn off the projection lamp 11' when the point on the drum, which was beneath the corona charger 23' when charging was terminated, reaches the drum's image projection station.

With the charger and or projection lamp shut off at the point on the drum where no further imaging is desired the reproduction on the copy is provided with only the image information desired and with no toner or coloration of the remaining portion of the document. Even though corona charging has been terminated from charger 23' and/or the projection lamp 11' turned off, the movement of the scanning mirrors continues and notch 37b will be sensed and used to control other components of the apparatus, setting of the various time routines so that the engine completes its cycle. Notch 37b thus is used to enable time routines to continue completion of the engine cycle. Different time routines may be actuated as in the prior art RP 505 machine to be actuated for different lengths of copy sheets.

Thus with the embodiment of FIGS. 10–12 a reader-printer apparatus is disclosed having the capability of reproducing selected image information stored on a microform and wherein portions thereof may be selectively edited when making enlargements and wherein the reproductions may be produced on media such as plain paper, etc.

EXTENSIONS AND MODIFICATIONS

While the improved apparatus of the invention has been disclosed with regard to copying a segment of information from the top edge or bottom edge of the document information shown on the screen to a certain fiducial mark the programming in the logic and control unit may be modified by permitting a two digit input before pressing the image length selection button. The logic could interpret this to mean that image selection is desired for information between say fiducial marks 2 and 4 where the buttons 2 and 4 have been pressed by the operator. Using either the apparatus of FIGS. 1–8 or the apparatus of FIG. 10–12 the logic's program would enable the corona chargers 23, 23' and projection lamps 11, 11' respectively to selectively reproduce the desired segments in accordance with the teachings set forth herein by controlling the periods of the operation of the chargers and projection lamps.

Other modifications may include the use of a digitized touch screen or the like to allow the operator to select and input into the control logic the particular segment of the document image to be reproduced in accordance with the teachings set forth herein.

Still a further modification will be described in conjunction with the flow chart illustrated in FIG. 13 and as an example, the apparatus of FIGS. 1–8. In this modification, controls are provided to improve reproduction quality by firstly controlling exposure duration not only in response to the operator's image length selection but also in response to lamp brightness which may be quantified by a factor, such as lamp voltage or power, which relates to lamp brightness. These controls are provided to overcome the problem of the brightness of the projection lamp affecting how quickly the lamp can be turned off; i.e., quenched. The controls also include an improved automatic exposure control for making prints. In the prior art reader-printer of FIG. 1 a circuit board 80 includes a number, say eleven, of spaced photocells 85 located thereon. If the automatic exposure button 81 on the operator's control panel 44 is pressed prior to making a print the brightness of the projection lamp 11 during the print mode is controlled in accordance with a reading made of light sensed by these photocells. This light is, of course, light that has been projected through the microform image frame or a major central portion thereof. When the print button 49 is pressed, the viewing mode ends and the projection lamp turns off. Mirror 17 moves out of the way to allow mirrors 16 and 21 to move to the left to a scan start position. Just before the mirrors 16 and 21 reach the scan start position, the projection lamp 11 is again illuminated. Light therefrom is modulated by the microform image which previously was projected onto the image screen and is now projected onto the photocells 85 (see FIGS. 1 and 8). The output of each photocell is proportional to the image light falling thereon and may be quantized by conventional circuitry. A reading from each photocell is sent to the reader-printer's logic and control unit where, for example, the highest and lowest light level readings may be averaged to control the brightness of the projection lamp such as by controlling the voltage or power thereto. When this adjustment is made, the print mode begins by moving the scan mirrors 16, 21 to the right in FIG. 1. In a manual exposure mode, the operator adjusts a dial 83 to control the brightness of the projection lamp desired and presses the manual exposure button 82.

Figure 13:
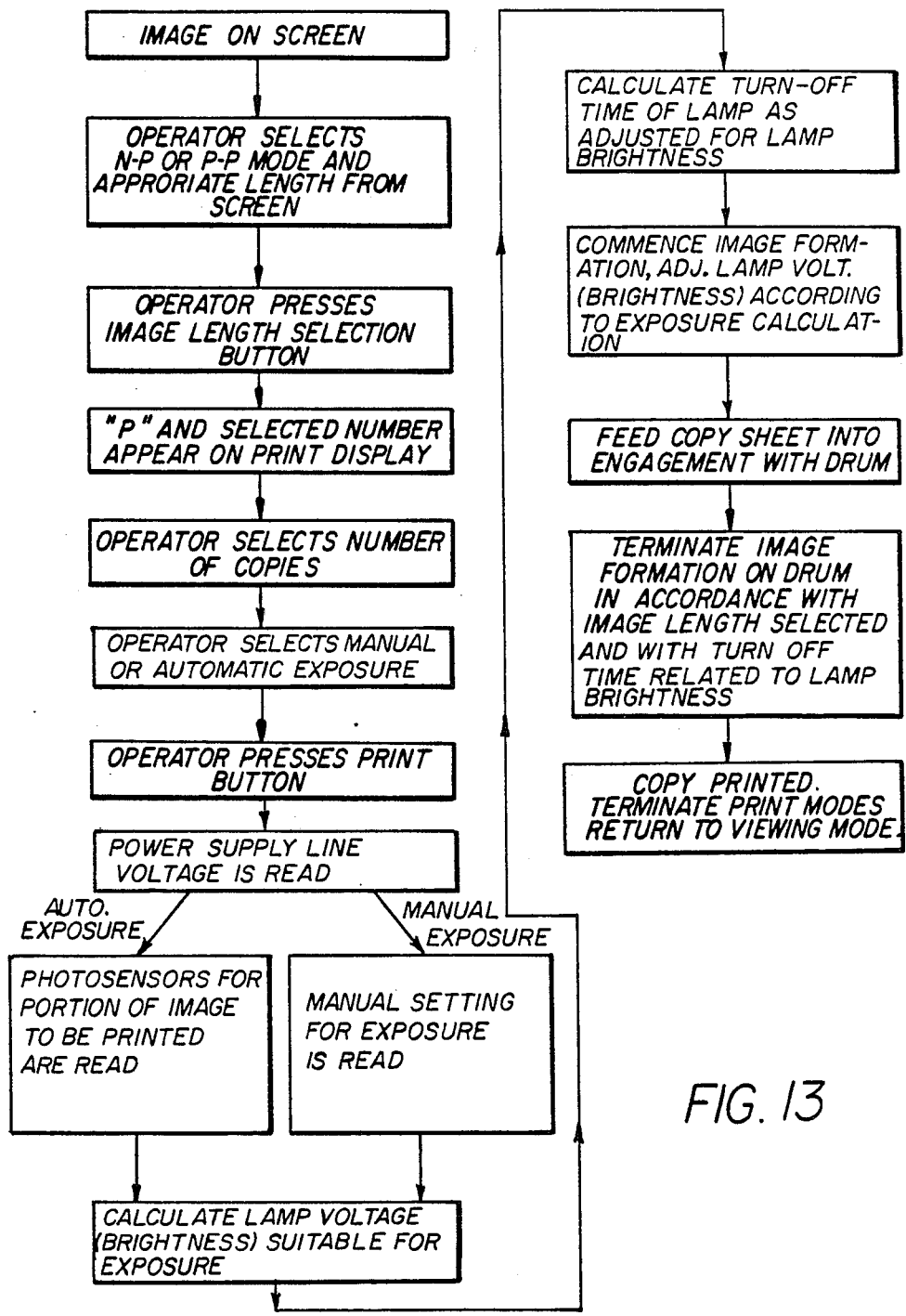
FIG. 13 is a flow chart representing the flow of information inputted by an operator using an improved modified reader-printer apparatus and the use to which this information is made by the modified reader-printer apparatus.

Returning now to the flow chart shown in FIG. 13, assume that the operator, when the apparatus is in the viewing mode, has indicated the desired N-P or P-P mode and has also provided inputs as to a desired image length selection and number of copies as described herein. The operator then selects either the automatic or manual exposure mode. Assume the automatic mode is selected by pressing button 81. In response thereto a signal is delivered to the CPU 51 through input signal logic buffer 50. When the print button 49 is pressed, the mirror 17 moves out of the way and scan mirrors 16, 21 move to the left. The projection lamp is turned off in response to actuation of the print button. When mirror 16 is moved sufficiently so that it no longer blocks light modulated by the microform image from impinging upon the photocells 85, the projection lamp is turned back on and illuminates all the photocells. Since the operator has directed that only a portion of the microform image frame be reproduced, the CPU is instructed by the control program memory 54 to consider only the photocells receiving light from the portion of the image frame selected for reproduction. Thus, of the total of eleven photocells perhaps only three are so located on the circuit board as to receive light from at least portions of the bottom one-third of the image frame. In this case, only the readings from these three photocells will be used by the CPU to automatically control exposure; i.e., the brightness of the projection lamp 11. This may be done using the same algorithm of say looking at the highest and lowest readings between, in this case, just the three photocells and averaging the high and low readings. Since line voltage 87 to the lamp's power supply 88 affects lamp brightness, controls including A/D converter 89 are provided to read this voltage and use the LCU 39 to adjust power or voltage to the projection lamp accordingly using a thyristor gate control 91 which comprises a part of the lamp's power supply 88. With the projection lamp brightness adjusted in accordance with the appropriate requirements for automatic exposure of the image portion selected for reproduction, the scan mirrors 16, 21 are moved from left to right and an incremental exposure of the image of a document page is made starting with the bottom portion of the image. With the calculation of lamp brightness for automatic exposure or the calculations of lamp brightness for the specific manual exposure setting, a further determination is made concerning adjustments of lamp turn-off time with regard to the brightness thereof during the exposure mode. A "look-up" table in memory 90 may be provided as part of the control program memory 54 to provide predetermined adjustments to turn-off time for various projection lamp voltage readings. Thus, the timer routines described previously and used to control operation of the corona charger 23 and projection lamp 11 in accordance with image length selected are provided with a minor adjustment to such timing to account for the time say a relatively bright bulb takes to completely become extinguished. Signals from the LCU output drivers 53 acting through thyristor 91 serve to control power or voltage to the projection lamp 11 for the time period determined in accordance with the aforementioned factors. If desired, a "closed-loop" control system may be provided wherein lamp brightness may be determined by sensing same directly using a photocell that "sees" light directly from the lamp that has not been modulated by image information. Similar modifications to the embodiment described with regard to FIGS. 10–12 are also contemplated by the invention. In lieu of selecting which photocells to consider readings for controlling lamp brightness, the invention contemplates that one or more photocells may be moved based on the image frame portion selected for reproduction so that the photocells are able to all read substantially only the portion selected for reproduction. Alternatively the image frame portion may be moved optically so that the photocells "see" the portion selected for reproduction.

The invention has been described in detail with particular reference to preferred embodiments thereof, but it will be understood that variations and modifications can be effected within the spirit and scope of the invention.

We claim:

1. In a reader-printer apparatus for viewing and reproducing an image stored on a microform, the apparatus including means for projecting an enlarged image of a microform image onto a screen for viewing of the microform image, means located on or proximate to the screen to delineate a portion of the image for selection of such portion for reproduction, image processing means including means for projecting light that has been modulated by the image on the microform onto a photosensitive member for reproducing on a copy sheet the portion of the microform image selected for reproduction, and the improvement which comprises:

wherein the photosensitive member and copy sheet are different members and the improvement further comprises signal producing means for inputting electrical signals identifying the portion of the microform image selected to be reproduced; and control means for receiving the inputted signals for controlling the image processing means to produce on the copy sheet only the image portion of the microform image selected for reproduction.

2. The apparatus of claim 1 and wherein the photosensitive member is a photoconductive member movable about a closed path and the image processing means further comprises corona charging means for electrostatically charging the drum, scanning exposure means for incrementally exposing the member to segments of the portion selected for reproduction to form an electrostatic image of such portion, developing means for developing the electrostatic image into a visible image and transfer means for transferring the visible image to a copy sheet that is longer in length than the visible image transferred thereto.

3. In a reader-printer apparatus for viewing and reproducing an image of a document page stored on a microform, the apparatus including means for illuminating the medium with light to modulate the light with the image on the medium, optical means for enlarging the image carried by said modulated light and for projecting said modulated light onto a viewing screen for viewing during a viewing mode and for impinging said modulated light in increments onto a moving photosensitive member to form a latent image of the enlarged image of the document page on the photosensitive member, means for developing the latent image to a visible image, and the improvement which comprises:
  selection means for selecting a portion of the document page to be reproduced and producing electrical signals specific to such selection, memory means responsive to said electrical signal for storing signals relative to the selection; and control means responsive to the signals stored in the memory means for producing a latent image on the photosensitive member of the image portion selected for reproduction and inhibiting formation of portions of the document page not selected for reproduction.

4. The apparatus according to claim 3 wherein the photosensitive member is an electro-photoconductive member, and the apparatus further includes means for moving the member about a closed path, means for electrostatically charging the member, movable means for incrementally scanning said modulated light upon the charged member to form an electrostatic latent image of the portion of the document page selected for reproduction, and means for transferring the developed image to a copy sheet that is longer in length than the developed image transferred thereto.

5. The apparatus according to claim 4 and wherein the control means controls the charging means to charge the member on areas of the member that are exposed to said light and to inhibit charging on those areas of the member wherein the scanning means is in those predetermined positions for forming images on the member of portions of the document page not selected for reproduction.

6. The apparatus according to claim 5 and wherein the control means controls the illuminating means to inhibit said light from impinging on the areas of the member wherein the scanning means is otherwise in those positions for forming images on the member of portions of the document page not selected for reproduction.

7. The apparatus according to claim 4 and wherein the control means controls the illuminating means to inhibit said light from impinging on the areas of the member wherein the scanning means is otherwise in those positions for forming images on the member of portions of the document page not selected for reproduction.

8. In a method of reproducing a selected portion of an image stored on a microform, the method including the steps of illuminating the microform with light to modulate the light with the image on the microform, optically forming an enlarged image of the image on the microform which image comprises light modulated by the image on the microform, impinging on a viewing screen the enlarged image of the microform, and the improvement which comprises the steps of:
  selecting a portion of the image on the microform to be reproduced and producing signals representing said portion selected or the portion not selected; exposing the enlarged image upon a photosensitive member and forming a visible enlarged image of the portion of the image on the microform selected for reproduction and using said signal to inhibit formation of a visible image of those portions of the image on the microform not selected for reproduction.

9. The method of claim 8 and wherein the photosensitive member is an electrophotoconductive member and wherein the visible image of the portion of the image frame selected for reproduction is transferred to a copy sheet that is longer in length than the visible image transferred thereto.

10. The method of claim 8 and wherein in the exposing step the exposure is made by scanning the enlarged image in increments upon the photosensitive member.

11. The method of claim 10 and wherein the photosensitive member is an electrophotoconductive member and wherein the visible image of the portion of the image frame selected for reproduction is transferred to a copy sheet that is longer in length than the visible image transferred thereto.

12. In a method of reproducing as an enlargement a selected portion of an image on an image frame stored on a microform, the method including the steps of illuminating the microform with light to modulate the light with the image, optically forming an enlarged image of the image frame which image comprises light modulated by the image on the microform, impinging on a viewing screen the enlarged image of the microform, and the improvement which comprises the steps of:
  selecting a portion of the image on the image frame to be reproduced and producing signals representing said portion selected or the portion not selected; forming upon a surface a visible enlarged image of the portion of the image frame selected for reproduction; and using said signal to inhibit formation of a visible image of those portions of the image frame not selected for reproduction.

13. The method of claim 12 and wherein the surface is an electrophotoconductive member and wherein the visible image of the portion of the image frame selected for reproduction is transferred to a copy sheet that is longer in length than the visible image transferred thereto.

14. The method of claim 13 and including an exposing step wherein exposure is made by scanning upon the photosensitive member light that has been modulated with image information of the portion of the image frame selected for reproduction.

15. The apparatus according to claims 1, 2, 3, 4, 5, 6 or 7 and wherein the means for projecting light includes a lamp; and the control means includes means for adjusting the turn-off time of the lamp in accordance with signals provided and relating to lamp brightness.

16. The method according to claims 8, 9, 10, 11 or 14 and including the steps of measuring the brightness of a lamp comprising the source of the light and adjusting the time for exposing of the image upon the photosensitive member in accordance with signals provided and relating to lamp brightness.

17. The apparatus according to claim 1 and wherein the apparatus includes touch or push-button means for inputting the number of copies of said image portion that are to be reproduced and for designating the portion of the image on the microform to be reproduced.

18. The apparatus according to claim 17 and wherein the same set of button means is used for both inputting the number of copies of said image portion and for designating the portion of the image on the microform to be reproduced.

19. The apparatus according to claims 1 or 3 and wherein the apparatus includes tactile means having indicia for designating the portion of the image on the microform to be reproduced.

20. The apparatus according to claim 1 and including automatic exposure control means for controlling the intensity of the light projected onto the photosensitive member, the automatic exposure control means being responsive to the signals identifying the portion of the microform image selected to be reproduced to selectively control exposure for such image portion.

21. In a reader-printer apparatus for viewing and reproducing an image stored on a microform, the apparatus including means for projecting an enlarged image of a microform image frame onto a screen for viewing of the microform image, means located on or proximate to the screen to identify a portion of the image frame, image processing means including a single lamp source means for projecting light that has been modulated by the image on the microform onto a photosensitive member for reproducing on a copy sheet the portion of the microform image frame identified for reproduction or an entire image frame when no selection is made for reproducing a portion of an image frame, and the improvement which comprises:

signal producing means for inputting electrical signals identifying the portion of the microform image frame selected to be reproduced; and exposure intensity control means for receiving the inputted signals for controlling the intensity of light projected onto the photosensitive member in accordance with the exposure control requirements for the selected portion.

22. In an apparatus for producing on a copy sheet an enlarged reproduction of a selected portion of an image stored on a microform, the apparatus comprising means for illuminating the microform image with light to modulate the light with the microform image, means for forming on a viewing screen the enlarged image of the microform image, and selection means for permitting selection of a portion of the enlarged image to be reproduced in accordance with indicia associated with the enlarged image and producing signals representing said portion selected or the portion not selected; means for producing upon a copy sheet whose length is independent of the portion of the enlarged image selected, a visible image of the portion of the enlarged image selected for reproduction; and means for using said signal to inhibit formation on the copy sheet of a visible image of those portions of the enlarged image not selected for reproduction.

23. The apparatus of claim 22, and wherein indicia are arranged adjacent the screen to denote possible selectable image lengths.

24. The apparatus of claim 23 and wherein said indicia includes characters and said selection means comprises a plurality of operator selectable buttons having corresponding characters identifying same for generating a signal indicative of the operator selection of the portion of the enlarged image to be reproduced.

* * * * *